March 26, 1940.
A. G. RAYBURN
2,194,614
LENS ASSEMBLY
Filed Sept. 9, 1937
2 Sheets-Sheet 1
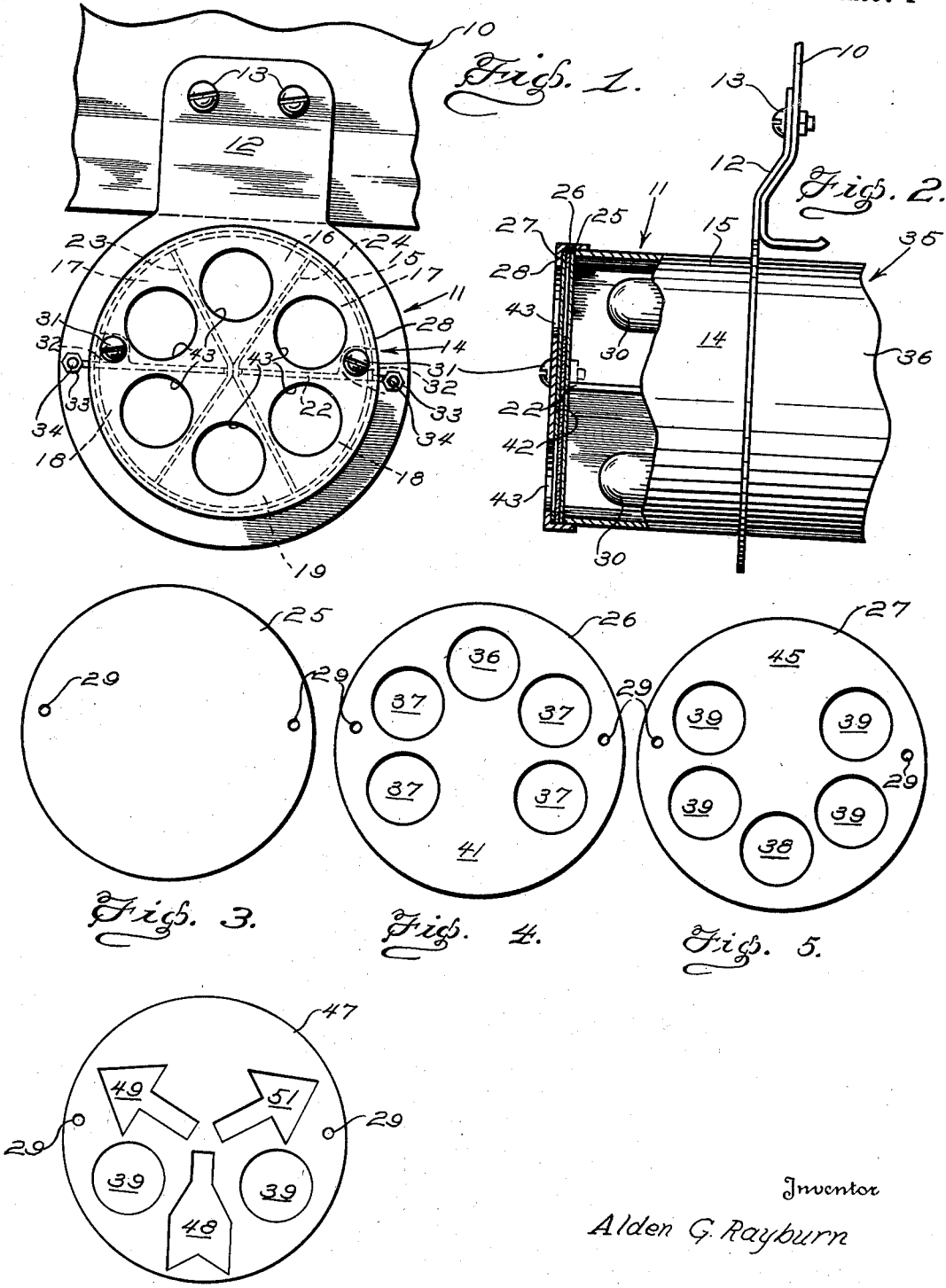
Inventor
Alden G. Rayburn
By Strauch & Hoffman
Attorney March 26, 1940.  A. G. RAYBURN  2,194,614
LENS ASSEMBLY
Filed Sept. 9, 1937  2 Sheets-Sheet 2

Inventor
Alden G. Rayburn
By Strauch & Hoffman
Attorneys

Patented Mar. 26, 1940

2,194,614

UNITED STATES PATENT OFFICE 2,194,614

LENS ASSEMBLY

Alden G. Rayburn, Sausalito, Calif., assignor of forty per cent to Arthur D. Knox, Nashville, Tenn., and twenty per cent to Eddy S. Rayburn, Sausalito, Calif.

Application September 9, 1937, Serial No. 163,133

2 Claims. (Cl. 177—326)

The present invention relates to a novel lens assembly designed to impart characteristic colors to the light emitted from each compartment of a multi-compartment light housing. This application is a continuation in part of my application Serial No. 750,900, filed October 31, 1934, for "Tell-tale signal light," issued August 23, 1938, as Patent No. 2,127,887. The primary object of the present invention resides in providing a light having a multiplicity of compartments each of which contains a light bulb with a lens assembly designed to impart a characteristic color to the light emitted from each compartment.

A further object of the present invention resides in superposing a plurality of different colored lenses upon one another in such a manner that light emitted from different portions of the lens assembly will have a characteristic color.

Still another object of the present invention resides in securing the several different colored lenses in assembled relation in a light housing by means of a single set of securing screws which also secure the cover in place.

A further object of the present invention resides in securing the several different colored lenses in assembled relation prior to their association with a light housing by means of an adhesive.

Another object of the present invention resides in providing an indicator light having a plurality of individual light bulbs with a novel lens structure which is adapted to impart a characteristic and readily recognizable color to each bulb so that a quick glance at the indicator will suffice to apprise the operator of the condition of the running light which is associated with each individual indicator light.

Another object of the present invention resides in providing a dash indicator with a lens structure having a plurality of superposed lens members which are apertured in predetermined relation to each other in order that the light emanating from the separate compartments will be of a distinct and characteristic color.

A further object of the present invention resides in providing a direction or turn signal light with a lens structure having a plurality of superposed lens members of different color associated in such a manner that the different signals indicated by the light shall have a characteristic color.

Still further objects of the invention will appear from the appended claims and accompanying specification when studied in connection with the attached drawings wherein:

Figure 1 is a front elevational view of the preferred form of indicator of the present invention.

Figure 2 is a side elevational view of the light of Figure 1 with certain parts in section to more clearly illustrate the present invention.

Figures 3, 4 and 5 are detailed views of the several members which are assembled in superposed relation to form the novel lens structure of the present invention.

Figure 6 is a view of a modified form of lens member which is used when it is desired to incorporate an indication of a turn signal in the dash indicator of the present invention.

Figure 7:
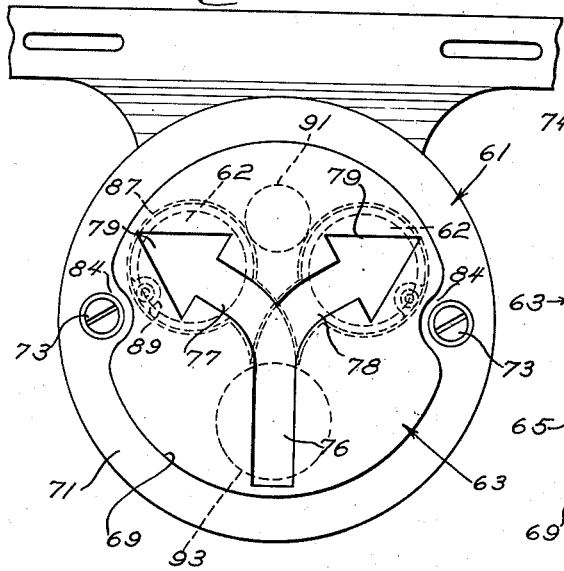
Figures 7 and 8 are front and side elevational views of a modified form of the present invention.
Figure 8:
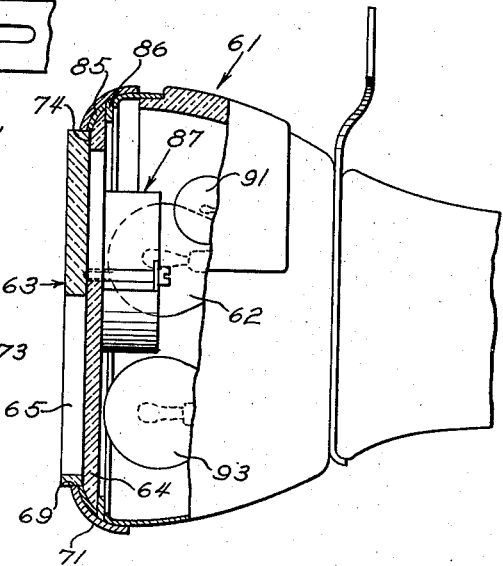

With continued reference to the drawings wherein like reference numerals indicate the same parts throughout the several figures and with particular reference to Figures 1-6 wherein the present invention is described in connection with a tell-tale signal light such as that described in my Patent No. 2,127,887, the numeral 10 indicates an appropriate supporting structure such as the dash board in the driving compartment of a motor vehicle. An indicator light designated broadly by the numeral 11 is suspended from the structure 10 by means of a supporting or mounting plate 12 which is secured to the structure 10 by means of nut and bolt assemblies 13. Although the indicator 11 is shown in the drawings as being suspended from structure 10 it will be understood that if desired a suitable aperture may be formed in the structure 10 and the indicator placed therein in a manner well known in the art.

The indicator 11 comprises a housing 14 which in the present instance takes the form of an open ended cylinder 15. The cylinder 15 is adapted to be divided into a number of individual compartments 16, 17, 18 and 19 by means of division plates 22, 23 and 24.

One end of cylinder 15 is closed by superposed translucent plates or disks 25, 26 and 27 and an apertured metal cover 28. Translucent disks 25, 26 and 27 and cover 28 are provided with aligned apertures 29 which are adapted to freely receive cap screws 31 designed to be screw-threadedly received in suitable apertures provided in ears 32 of plate 22. Cylinder 15, partitions 22, 23 and 24, disks 25, 26 and 27 and cover 28 are maintained in assembled relation in housing 14 by means of screws 31 to form an assembly which can be handled and mounted as a unit on plate 12. This unitary structure need not be disassembled except to replace the lenses.

Housing 14 is secured to support 12 as in Patent No. 2,127,887 by means of nuts 33 which are received on the threaded ends of studs 34 which are threaded into and secured in suitable apertures formed in support 12.

Support 12 also carries a housing 35 which provides protection for a plurality of electromagnetic switches (not shown) designed to automatically energize bulbs 30 disposed in compartments 16, 17, 18 and 19. In the present preferred embodiment housing 35 comprises a cylindrical body portion 36 divided into a number of electrically isolated individual compartments corresponding in number to compartments 16, 17, 18 and 19 of housing 14. Housings 14 and 35 are disposed in alignment with one another and secured in place in the manner illustrated in my above mentioned Patent No. 2,127,887.

As pointed out in the preceding detailed description each compartment of housing 14 is provided with a bulb 30 individually operated by means of the independent electro-magnetic switches provided in housing 36. In the embodiment of the invention now under discussion standard miniature six volt 0.15 ampere light bulbs 30 are employed in compartments 16, 17, 18 and 19. Each switch and its associated bulb 30 is associated with a separate running light circuit and the compartment in which the different indicator bulbs are mounted is preferably chosen so that its position will of itself aid the operator in determining which running light is indicated by the lighting of each miniature bulb. In the preferred arrangement compartment 16 is lighted by operation of the tail light bulb and the light emitted therefrom is of a characteristic red color. Compartments 17 are adapted to show the proper functioning of the left and right hand head light distance bulbs or beams and compartments 18 the left and right hand head light city driving bulbs or beams. The light from compartments 17 and 18 is, therefore, preferably of a characteristic white color. Compartment 19 indicates the operation of the brake stop light and the light emitted therefrom is preferably green so that it may emit a characteristic color. From the above description it will be clear that the position and color of the light from each compartment combine to form an indication that is quickly and readily recognizable by the vehicle operator so that a close scrutiny of the indicator is not necessary.

The novel lens structure constituting the present invention and designed to provide the characteristic coloring for the light emitted from each compartment will now be described in detail. As previously pointed out, the lens of the present invention comprises three superposed disks 25, 26 and 27. Disk 25, shown in Figure 3, is preferably imperforate except for apertures 29 for receiving screws 31. This disk is adapted to emit light of a white color and is preferably formed from a semi-transparent artificial resin product or a clear resin product frosted on one or both sides. Such a product tends to eliminate glare, is unbreakable, and is sold on the market under the name of "Catalin." It will be understood that glass, Celluloid, or other suitable material could be used in place of "Catalin" if desired.

Disk 26, Figure 4, is preferably of green "Catalin" and is provided with apertures 36 and 37 of circular contour and about 3/8" in diameter. These apertures are equally spaced from the center of the disk and the apertures 37, being four in number, are disposed above and below the horizontal center line at an angle of 30° therefrom. The aperture 36 is disposed on the vertical center line adjacent the top of disk 26 so that the apertures which are five in number are located at points directly over the individual compartments of housing 14. This plate is superposed upon disk 25 with the apertures 29 of each disk in alignment.

The remaining disk 27 is preferably of red "Catalin" and it is provided with apertures 38 and 39 of slightly smaller size than apertures 36 and 37 of disk 26. Apertures 38 and 39 are disposed in an angular relation identical to that of the disk 26 and the apertures 29 thereof are aligned with apertures 29 of disks 25 and 26. This disk is superposed upon the disk 26 with apertures 39 in alignment with apertures 37 of disk 26 and the aperture 38 overlying the imperforate lower portion 41 of disk 26. The three disks superposed one upon the other as pointed out above are placed within the cover 28 with the red disk 27 in contact with the inside face 42 of cover 28. Cover 28 is provided with six apertures 43 in alignment with and corresponding in shape to, but slightly smaller than apertures 36, 37, 38 and 39 of disks 26 and 27. Apertures 29 provided in cover 28 are disposed in alignment with apertures 29 of the disks 25, 26 and 27 and the screws 31 are passed freely through these apertures and screwed into the ears 32 of plate 22 to maintain the disks and cover in their proper superposed and angular positions upon housing 14.

From the above description it will be seen that since apertures 37 and 39 of disks 26 and 27 are disposed in alignment with each other and with apertures 43 of cover 28, the light emanating therefrom will be of a non-glaring white color, since it passes only through the imperforate disk 25. These apertures indicate the headlight beams, the apertures on the left corresponding to the left headlight and those on the right to the right headlight. Since the present day motor vehicle is usually provided with adjustable beam headlights, it is desirable to have a device for indicating proper operation of each beam. In the present invention the upper aligned apertures 37, 39 and 43 indicate the condition of the road driving or distance beam of the respective headlights, and the lower aligned apertures 37, 39 and 43 indicate the condition of the city or lower driving driving beam of the respective headlights.

The remaining apertures 43 give off different colored light due to the following structure. As described above, the aperture 38 (aligned with lowermost aperture 43) overlaps the imperforate portion 41 of disk 26 and, therefore, emits light of a non-glaring green color. This aperture indicates the operation of the brake stop light. The upper aperture 43 emits a red light since aperture 36 of disk 26 lies beneath the imperforate portion 45 of the red disk 27. This aperture indicates the operation of the tail-light and corresponds in color thereto.

By the above construction it will be appreciated that a very simple and effective method of identifying the running lights by the miniature bulbs 30 in the separate compartments is provided. It will also be apparent that both the position and color of the different compartments aids the driver in reading the indicator in a quick and accurate manner.

A further advantageous feature of the present invention is the ease with which the indicator may be adapted to indicate the operation of additional running lights, such as left and right turn signals, etc. To adapt the indicator for this purpose, it is preferably provided with a slightly different red "Catalin" disk 47 (Figure 6).

The disk 47 is provided with apertures 48, 49 and 51. Aperture 48 is in the form of an arrow tail and this aperture is lighted upon operation of the brake in the manner previously described and is also operated upon actuation of the turn signal switch. The bulbs 30 in alignment with apertures 49 and 51 are connected through appropriate circuits to the left and right turn arrow headlights of the turn signal and the remaining apertures 39 are illuminated upon the lighting of either of the headlight filaments or bulbs. In this use of disk 47 it is to be understood that the corresponding apertures 43 of cover 28 will be modified.

Upon operation of a suitable turn signal switch, either one or the other of the turn signal circuits is energized and the associated left or right hand arrow 49 or 51 of the indicator is lighted. In order that a large and readily discernible signal will be displayed, it is desirable to simultaneously illuminate the stop light, which in this modification is indicated by aperture 48 of the indicator light.

From the preceding description, it will be clear that the present invention provides a simple and durable lens assembly designed to cooperate with a tell-tale indicator in such a manner that the user of the indicator may quickly and easily determine the information intended to be given by the indicator.

Figures 7 through 10 illustrate a modified form of the present invention applied to a combination tail-lamp stop light and direction signal light. To this end, a conventional "Ford" tail-light and stop light 61 is provided with additional sockets (not shown) and bulbs 62 energized through suitable control circuits (not shown). The ordinary "Ford" lens is eliminated and a lens assembly 63 formed by superposed "Catalin" or like lens members 64 and 65 combined in the following manner is substituted.

Figure 9:
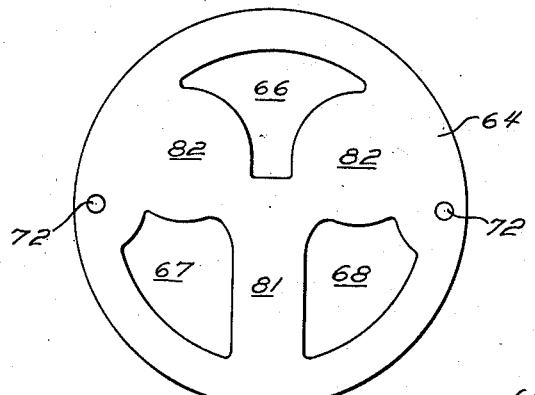
Figures 9 and 10 are plan views of the individual lens members of the form of invention shown in Figures 7 and 8.
Figure 10:
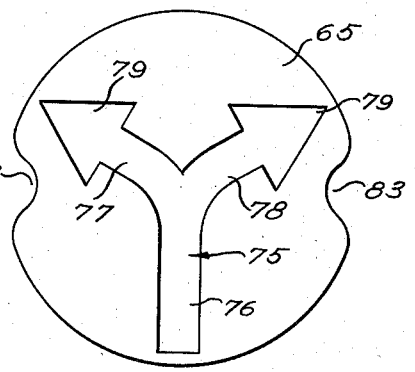
Figure 11:
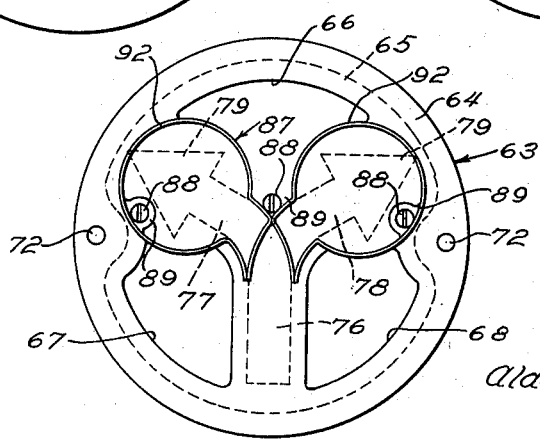
Figure 11 is a detail view of the lens members of Figures 9 and 10 in assembled relation prior to their association with the light of Figures 7 and 8.

Member 64 is provided with apertures 66, 67 and 68 as shown in Figures 9 and 11 and is of such size that it protrudes beyond opening 69 provided in the usual cover 71. Apertures 72 are provided adjacent the periphery of member 64 for freely receiving securing screws 73 adapted to secure lens assembly 63 and cover 71 upon light 61.

Member 65 is superposed upon member 64 and secured thereto by any suitable transparent adhesive indicated at 74. Member 65 is provided with a substantially Y-shaped aperture 75 comprising an elongated vertical branch 76 and divergent branches 77 and 78 terminating in arrow heads 79. Branch 76 is positioned over imperforate portion 81 of member 64 and branches 77 and 78 and arrow heads 79 are disposed over imperforate portions 82 of member 64. Suitable indentations 83 are provided in the periphery of member 65 so as to receive the inwardly extending bosses or formations 84 provided on cover 71 for receiving screws 73. The periphery of member 65 is of such size and contour that it snugly fits within aperture 69 in cover 71.

Formations 84 and indentations 83 serve to properly position lens assembly 63 with relation to cover 71 and the bulbs in light 61. Suitable gaskets 85 and 86 provide weather-proof joints between lens 63 and cover 71 and cover 71 and light 61.

Since the modified light of the present modification performs the dual function of a tail and stop-light and a direction signal light, members 64 and 65 are provided in contrasting colors preferably green and red respectively. As a consequence of the color arrangement, the light passing through apertures 66, 67 and 68 is of a red hue while that emanating from the aperture 75 is of a green hue.

In order to effectively display the direction arrows, a suitable shade 87 having the form indicated in Figures 7 and 11 is associated with lens assembly 63. To this end screws 88 are passed freely through ears or bosses 89 provided on shade 87 and are threaded into suitable threaded apertures in member 64.

As a result the rays from tail light bulb 91, which is disposed between circular portions 92 of shade 87, are prevented from passing directly to apertures 67, 68 and 75. Aperture 66 will, therefore, present a vivid red color while apertures 67 and 68 and aperture 75 will receive indirect light only and be of a relatively faint red and green color.

In the event that stop light bulb 93 is lighted by application of the brakes, the apertures 67 and 68 will be vividly illuminated as will branch 76 of aperture 75. Aperture 66 will also receive indirect rays from bulb 93 and will brighten considerably. As a consequence, a bright red field with a vertical green bar, formed by branch 76, on its vertical center line will result from the application of the brakes.

Upon the operation of the switch controlling the direction signal bulbs, the bulb 93 and one or the other of the bulbs 62 will be lighted in unison. As a consequence, a red field having a green arrow pointing in the contemplated direction of deviation will be displayed. In the daytime, bulb 91 will not be lighted, however, the rays from bulb 93 will be sufficient to adequately illuminate aperture 66.

Shade 87, due to its relation to bulbs 62 and 93, will prevent noticeable illumination of the branch 77 or 78 not intended to be illuminated.

The present invention, accordingly, provides a simple and effective lens assembly for use in combination signal lights of the character described.

It will be understood that disks 25, 26, 27 and 47 may be joined together by transparent adhesive in the same manner that members 64 and 65 are joined or that members 64 and 65 may with only slight alterations be assembled in the same manner as disks 25, 26, 27 and 47 without departing from the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination a plurality of translucent members comprising an imperforate translucent plate of a predetermined color characteristic; a translucent plate of a different predetermined color characteristic having a number of apertures therein positioned in superposed relation on said imperforate plate; a second perforated translucent plate of a still different predetermined color characteristic having a plurality of apertures therein positioned in superposed relation on said first mentioned perforated plate with certain of said apertures in registry with the apertures in said first mentioned perforated plate and certain other of said apertures overlying unperforated portions of said first mentioned perforated plate; and means associated with said plates for retaining them in predetermined superposed relation whereby a light embodying different characteristics emanates from selected apertures.

2. A lens structure of the character described comprising an imperforate translucent disk; a colored disk having a plurality of apertures therein superposed upon said imperforate disk; a second disk of a different color having a plurality of apertures therein superposed upon said first mentioned perforate disk with certain of said apertures aligned with the apertures in said first mentioned perforate disk and certain others of said apertures overlying the imperforate portions of the intermediate disk; and means for securing said disks in predetermined relation with each other, whereby selected ones of the several apertures emit light rays of different colors.

ALDEN G. RAYBURN.